US006685314B1

(12) United States Patent
Friedman

(10) Patent No.: US 6,685,314 B1
(45) Date of Patent: Feb. 3, 2004

(54) CLIP-ON SUNGLASSES

(76) Inventor: Dean Friedman, 61 Ulster Ave., Atlantic Beach, NY (US) 11509

( * ) Notice: Subject to any disclaimer, the term of this patent is extended or adjusted under 35 U.S.C. 154(b) by 0 days.

(21) Appl. No.: 10/298,283

(22) Filed: Nov. 18, 2002

(51) Int. Cl.[7] .............................. G02C 5/04; G02C 9/00
(52) U.S. Cl. ...................... 351/128; 351/124; 351/47
(58) Field of Search ................... 381/47, 57, 48, 381/58, 124, 128

(56) References Cited

U.S. PATENT DOCUMENTS

| | | | |
|---|---|---|---|
| 2,926,563 A | 3/1960 | Lockwood | |
| 3,575,497 A | 4/1971 | Leblanc | |
| 5,164,749 A | 11/1992 | Shelton | |
| D350,359 S | 9/1994 | Friedman | |
| 5,477,281 A | * 12/1995 | Boyer | ........................ 351/128 |
| 5,801,804 A | 9/1998 | Pennise | |
| 5,953,096 A | 9/1999 | Friedman | |
| 6,234,628 B1 | 5/2001 | Friedman | |
| 6,302,538 B1 | 10/2001 | Friedman | |

* cited by examiner

Primary Examiner—Hung Xuan Dang
(74) Attorney, Agent, or Firm—Robert L. Epstein, Esq.; Harold James, Esq.; James & Franklin, LLP

(57) ABSTRACT

The lens sections of the sunglasses are joined by a spring mechanism. The mechanism includes first and second concentric tubular members. Each member is affixed to the rim of a different one of the lens sections. The members enclose the spring which urges the lens sections toward each other, such that prongs mounted on the rims can engage an eyeglasses frame to mount the sunglasses thereon.

23 Claims, 2 Drawing Sheets

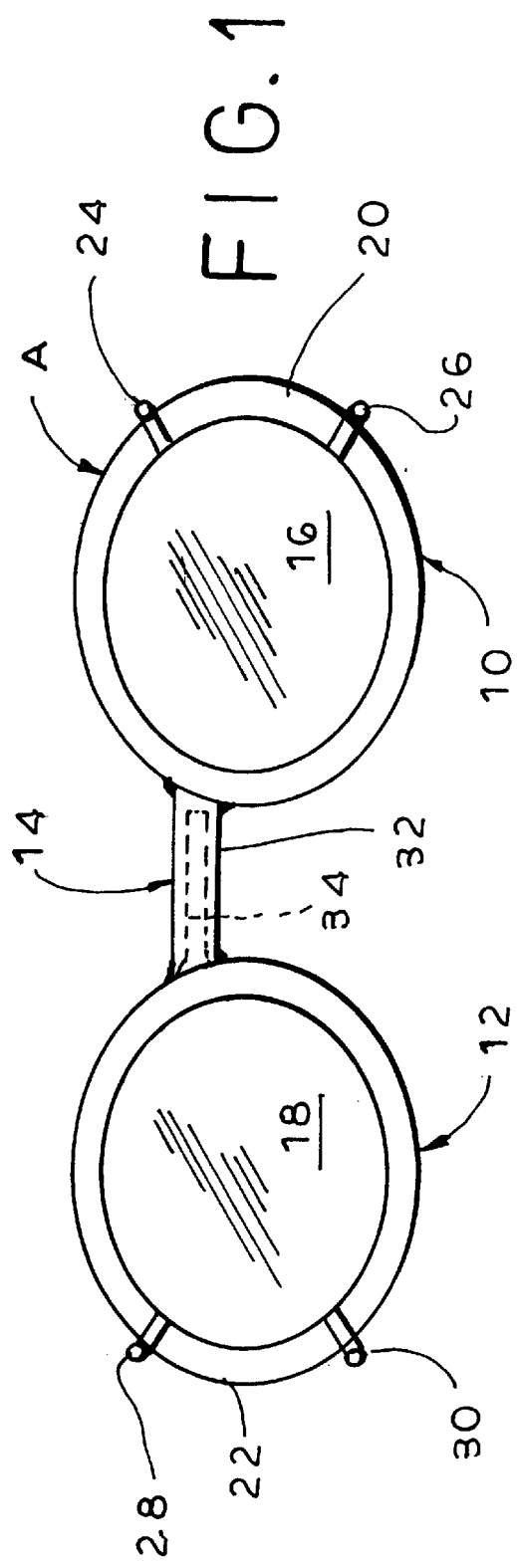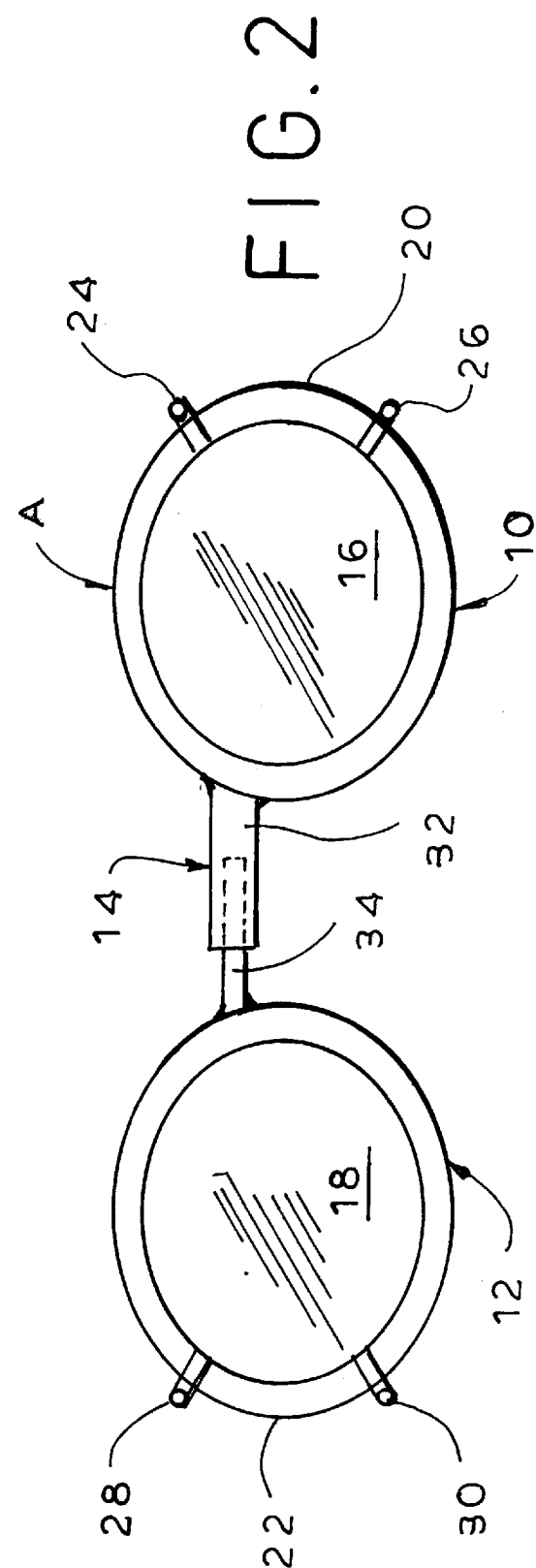

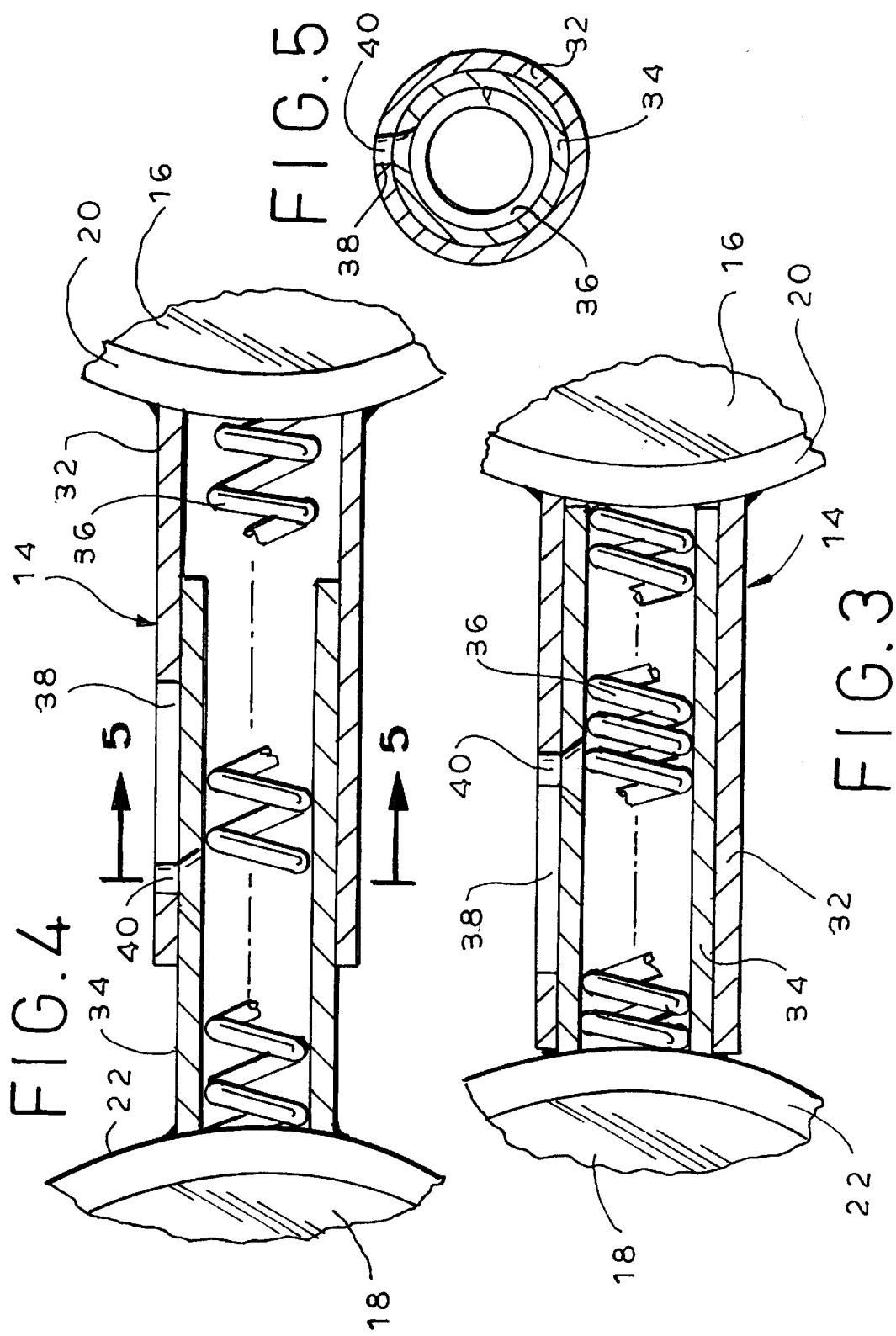

CLIP-ON SUNGLASSES

The present invention relates to clip-on sunglasses and more particularly to an improved enclosed spring bridge mechanism for clip-on sunglasses that enables the sunglasses to be easily mounted on eyeglasses.

Clip-on sunglasses consist of a metal or plastic frame that carries a pair of light attenuating plastic or glass lenses. A mechanism is provided to removably mount the clip-on sunglasses on the frame of eyeglasses.

In order to be commercially acceptable, the clip-on sunglasses must be light in weight, reasonably rugged and relatively inexpensive. They must also be easy to mount on and remove from eyeglasses. Further, the clip-on sunglasses must mount without damaging the eyeglasses, particularly the lenses.

One common type of mounting mechanism is a clamp that is attached to the bridge of the sunglasses. The clamp typically includes pairs of opposing prongs which are spring-loaded toward each other so as to retain the lenses of the eyeglasses between the prongs. Examples of this clamp-type mechanism are disclosed in U.S. Pat. No. 3,575,497 issued Apr. 20, 1971 to Leblanc, U.S. Pat. No. 5,164,749 issued Nov. 17, 1992 to Shelton and U.S. Pat. No. Des 350,359 issued Sep. 6, 1994 to Friedman.

However, clamp-type mechanisms have their disadvantages. The prongs must clamp tightly to the lenses, potentially scratching the lenses. The mechanism may obstruct the view partially. Moreover, the clamp-type mechanisms have several inter-engaging parts which must be fabricated precisely and assembled, making the mechanism relatively expensive and sometimes unreliable.

In order to overcome the drawbacks of the clamp-type mechanisms, a mechanism was developed for mounting clip-on sunglasses that does not contact or clamp the lenses of the eyeglasses and therefore cannot scratch them. This type of mechanism utilizes one or more sets of exposed spring-loaded prongs. The prongs are movably or flexibly mounted such that they can be moved against a spring force, for insertion between spaced portions of the eyeglasses frame. The spring force causes the prongs to frictionally engage the eyeglasses frame. Because the prongs only engage the frame, the lenses of the eyeglasses cannot be scratched. An example of such a mechanism is disclosed in U.S. Pat. No. 5,953,096 entitled "Universal Center Bridge Mounting Mechanism for Clip-On Sunglasses" issued to me on Sep. 14, 1999.

Another type of clip-on sunglasses, such as is disclosed in Lockwood U.S. Pat. No. 2,926,563, consists of mirror image frame sections, each of which consists of a lens and a bridge element. The bridge elements are connected together by a bridge mechanism that includes an exposed metal coil spring. The mechanism permits the frame sections to move away from each other, against the force of the spring. Each frame section, at its outer extremity, is provided with a set (typically two or three) of eyeglasses frame engaging prongs protruding from the plane of the lens sections. When the frame sections are moved away from each other, against the force of the spring, the eyeglasses frame can be inserted between the prongs. Releasing the frame sections permits the spring to move frame sections back toward each other, such that the eyeglasses frame is securely retained between the prongs.

One problem inherent in the Lockwood type spring bridge mechanism is that the coil spring is exposed. Aside from being unsightly, this is undesirable because bits of solid debris and other particulate foreign matter can lodge between the coils and jam the mechanism or distort the spring. Liquid, such as rain or sweat, can enter the mechanism resulting in rusting or deterioration of the parts. Further, the skin, hair and eyebrows of the user are not protected from the exposed spring.

I therefore developed an improved spring bridge mechanism that overcomes the exposed spring problem by enclosing the coil spring within a slender tubular enclosure. The enclosure isolates the spring from the skin and hair of the wearer and prevents debris and liquids from reaching the spring.

The enclosure serves the additional purpose of keeping the frame sections in the proper plane as they are moved. This is achieved by a slot in the enclosure which cooperates with a protrusion to maintain the frame sections in the same plane. The interior wall of the enclosure also provides an end surface for the spring to abut.

Aside from isolating the spring from the environment, the enclosure enhances the appearance of the clip-on sunglasses by hiding the unsightly spring. Preferably, the enclosure is made of the same material and finish as the bridge elements and frame, resulting in a mechanism which is much less conspicuous than an exposed spring.

I received U.S. Pat. Nos. 6,234,628 and 6,302,538, issued May 22, 2001 and Oct. 16, 2001, respectively, for my enclosed spring bridge mechanism. The clip-on sunglasses disclosed in those patents, as well as the clip-on sunglasses disclosed in Lockwood, require sets of protruding prongs mounted on opposite sides of the lens sections of the sunglasses to receive the eyeglasses frame. However, the prongs on the lens sections are unsightly and because the prongs must protrude out of the plane of the sunglasses, they may catch on other objects and make it difficult to store the sunglasses.

The need for protruding prongs on clip-on sunglasses can be avoided by providing spaced engaging parts on the eyeglasses frame and mounting the sunglasses by moving the lens retaining frame sections of the sunglasses toward each other and inserting the sunglasses between the engaging parts on the frame of the eyeglasses. That structure is disclosed in my co-pending application Ser. No. 10/273533, filed Oct. 21, 2002 and entitled "Eyeglasses and Clip-On Sunglasses Therefor."

I am aware of U.S. Pat. No. 5,801,804, issued Sep. 1, 1998 to Robert Pennise, entitled "Linearly Adjustable Sunglasses" that discloses clip-on sunglasses that do not require protruding prongs. In Pennise, the lens sections of the sunglasses are moved toward each other in order to mount the sunglasses, as in my co-pending application Ser. No. 10/273,533. However, Pennise's clip-on sunglasses are designed to mount between the temple pieces of the eyeglasses frame, and hence behind the lenses of the eyeglasses, making the sunglasses uncomfortable to wear and hence impractical. Moreover, Pennise's sunglasses require a second bridge part, spaced from the spring bridge, to maintain the lenses in the same plane.

Although the clip-on sun glasses structure disclosed in my co-pending application Ser. No. 10/273533 noted above works well, it requires specially fabricated eyeglasses, which could be considered to be a drawback. I have therefore invented improved clip-on sunglasses that function in a manner similar to the structure disclosed in U.S. Pat. Nos. 6,234,628 and 6,302,538, in that specially fabricated eyeglasses are not required and the frame sections are moved apart for mounting. However, the improved clip-on sunglasses have the spring bridge mechanism located between and directly connected to the frame sections, similar to that disclosed in my co-pending application Ser. No. 10/273533, such that the bridge elements are eliminated, resulting in a simpler, more aesthetically pleasing structure.

It is, therefore, a prime object of the present invention to provide improved clip-on sunglasses with an enclosed spring bridge mechanism attached directly to and between the lens sections, that does not require specially fabricated eyeglasses.

It is another object of the present invention to provide improved clip-on sunglasses with an enclosed spring bridge mechanism that is simple and aesthetically pleasing.

In accordance with the present invention, clip-on sunglasses is provided including first and second sections. Each of the sections includes a lens, a rim at least partially surrounding the lens and an eyeglasses engaging prong mounted to the rim. Means for connecting the first and second sections for movement between a proximate position and a remote position are provided. The connecting means includes a first tubular member connected to the rim of the first section, a second tubular member connected to the rim of the second section and spring means for urging the sections toward the proximate position.

The first tubular member is received within the second tubular member. The spring means is at least partially received within the first tubular member.

Means are provided for preventing relative rotation between the tubular elements. The rotation preventing means includes a protrusion on one of the tubular members and a protrusion receiving slot in the other member. The slot is elongated in the direction of movement of the sections.

The spring means includes a spring with first and second ends. The first spring end is fixed to the rim of the first section. The second spring end is fixed to the rim of the second section.

Preferably, a second eyeglass engaging prong is located on each of the sections. The second prong is spaced from the first prong. The connecting means forms the bridge of the sunglasses. It is situated between the first and the second sections.

To these and to such other objects which may hereinafter appear, the present invention relates to improved clip-on sunglasses, as set forth in detail in the following specification and recited in the annexed claims, taken together with the accompanying drawings, wherein like numerals refer to like parts, and in which:

FIG. 1 is a rear elevational view of the clip-on sunglasses of the present invention, showing the lens sections in the proximate position;

FIG. 2 is a rear elevational view of the clip-on sunglasses of the present invention, showing the lens sections in the remote position;

FIG. 3 is an enlarged cross-sectional view of the bridge of the present invention, in the proximate position;

FIG. 4 is an enlarged cross-sectional view of the bridge of the present invention, in the remote position; and FIG. 5 is an enlarged cross-sectional view of the bridge, taken alone line 5—5 of FIG. 4.

As seen in FIGS. 1 and 2, the clip-on sunglasses of the present invention, generally designated A, include mirror image lens sections 10, 12 connected together by a spring mechanism, generally designated 14, located between the lens sections, which forms the bridge of the sunglasses.

Section 10 includes a glass or plastic light attenuating lens 16 at least partially enclosed by a metal or plastic rim 20. Generally "L" shaped eyeglasses engaging prongs 24, 26 are mounted on and extend from spaced locations on rim 20.

Section 12 includes a glass or plastic lens 18 at least partially enclosed by a rim 22. Rim 22 has generally "L" shaped eyeglasses engaging prongs 28, 30 mounted on and extending from spaced locations on rim 22.

Sections 10, 12 are moveable between a normal, proximate position, as seen in FIG. 1, and a remote position, as seen in FIG. 2. This is possible because of spring mechanism 14.

FIGS. 3, 4 and 5 illustrate the structure of mechanism 14. Mechanism 14 includes an outer tubular member 32, one end (right as seen in the drawings) of which is fixed to rim 20, and an inner tubular member 34, one end (left as seen in the drawings) of which is fixed to rim 22.

The diameter of member 32 is larger than the diameter of member 34, as seen in FIG. 5, such that member 34 can be received within member 32. A spring 36 is received within inner tubular member 34. The ends of spring 36 are fixed to rims 20 and 22, respectively.

As lens sections 10 and 12 are moved apart, members 32, 34 move from the relative position shown in FIG. 3 to the relative position shown on FIG. 4, stretching spring 36. Spring 36 urges the sections toward the proximate position, shown in FIG. 3.

Means are provided for preventing relative rotation between members 32 and 34 such that the lenses 16, 18 remain in the same plane, as the lens sections move. This means comprises a protrusion 40 extending above the surface of member 34 and a protrusion receiving slot 38 in member 32. Slot 38 is elongated in the direction of the axis of the members and hence in the direction of movement of the sections 10, 12. This protrusion/slot combination limits the distance that the sections can be pulled apart and one member from rotating relative to the other member.

In operation, the lens sections 10, 12 of the clip-on sunglasses are pulled apart, stretching spring 36, as protrusion 40 moves along slot 38 from the position shown in FIG. 3 to the position shown in FIG. 4. Sunglasses A are placed adjacent to the front of the eyeglasses to which they are to be mounted, with the eyeglasses frame situated between the prong sets 24, 26 and 28, 30. The lens sections are then released, such that the spring urges the sections to move toward to proximate position, causing the prongs to engage the eyeglasses frame.

It will now be appreciated that the present invention relates to improved clip-on sunglasses which utilizes an enclosed spring mechanism situated between the lens sections. The mechanism includes concentric hollow tubular members, respectively connected to the rims of the lenses, which fully enclose the spring. The mechanism is mechanically simple and aesthetically pleasing.

While only a single preferred embodiment of the present invention is disclosed herein for purposes of illustration, it is obvious that many variations and modifications could be made thereto. It is intended to cover all of these variations and modifications which fall within the scope of the present invention, as defined by the following claims.

I claim:

1. Clip-on sunglasses comprising first and second sections each comprising a lens, a rim at least partially surrounding said lens and an eyeglass engaging prong mounted to said rim, and means for connecting said first and second sections for movement between a proximate position and a remote position, said connecting means comprising a first tubular member connected to said rim of said first section, a second tubular member connected to the rim of said second section, and spring means for urging said sections toward said proximate position, said spring means comprising a first end connected to the rim of said first section and a second end connected to the rim of said second section.

2. The sunglasses of claim 1 wherein said first tubular member is received within said second tubular member.

3. The sunglasses of claim 1 wherein said spring means is at least partially received within said first tubular member.

4. The sunglasses of claim 1 further comprising means for preventing relative rotation between said tubular members.

5. The sunglasses of claim 4 wherein said rotation preventing means comprises a protrusion on one of said tubular members and a slot in the other of said tubular members.

6. The sunglasses of claim 5 wherein said slot is elongated in the direction of said movement of said sections.

7. The sunglasses of claim 1 wherein said spring means comprises a spring with first and second ends, said first spring end being fixed to the rim of said first section and said second spring end being fixed to the rim of said second section.

8. The sunglasses of claim 1 further comprising a second prong located on each of said sections.

9. The sunglasses of claim 1 wherein said connecting means comprises the bridge of said sunglasses.

10. The sunglasses of claim 1 wherein said connecting means is situated between said first and said second sections.

11. Clip-on sunglasses comprising first and second sections each comprising a lens, a rim at least partially surrounding said lens and first and second eyeglasses engaging prongs mounted at spaced locations to said rim, and means for connecting said first and second sections for movement between a proximate position and a remote position, said connecting means comprising a first member connected to said first section, a second member connected to said section, said first member being telescopically received within said second member and spring means operably interposed between said sections for urging said sections toward said proximate position, said connecting means being situated on a line which extends between said first and second prongs of each of said sections, respectively.

12. The sunglasses of claim 11 further comprising means for preventing relative rotation between said sections.

13. The sunglasses of claim 12 wherein said rotation preventing means comprises a protrusion on one of said members and a slot in the other of said members.

14. The sunglasses of claim 13 wherein said slot is elongated in the direction of said movement of said sections.

15. The sunglasses of claim 11 wherein said spring means comprises a spring with first and second ends, said first spring end being fixed to the rim of said first section and said second spring end being fixed to the rim of said second section.

16. The sunglasses of claim 11 wherein said connecting means comprises the bridge of said sunglasses.

17. The sunglasses of claim 11 wherein said connecting means is situated between said first and said second sections.

18. Clip-on sunglasses comprising first and second lens sections, each of said sections having an eyeglass engaging prong, a top edge, a bottom edge, and a portion situated between the top edge and the bottom edge of the section, spring means for permitting relative movement of said sections between a proximate position and a remote position, and means for retaining said sections within a plane as they move between said positions, said movement permitting means and said retaining means comprising a single means for connecting said sections, said single connecting means extending between said portion of said first section and said portion of said second section.

19. The sunglasses of claim 18 wherein said single connecting means comprises first and second telescoping members and spring means operably connected between said members.

20. The sunglasses of claim 19 wherein said first member is received within said second member.

21. The sunglasses of claim 20 wherein said spring means is at least partially received within said first member.

22. The sunglasses of claim 19 wherein said retaining means comprises a protrusion on one of said members and a slot in the other of said members.

23. The sunglasses of claim 19 wherein said spring means comprises a spring with first and second ends, said first spring end being fixed to said first section and said second spring end being fixed to said second section.

* * * * *